United States Patent
Takai et al.

(10) Patent No.: US 11,407,124 B2
(45) Date of Patent: Aug. 9, 2022

(54) ROTARY JOINT

(71) Applicant: TOYOTA JIDOSHA KABUSHIKI KAISHA, Toyota (JP)

(72) Inventors: Tomohisa Takai, Nagoya (JP); Yoshihiko Takeuchi, Gamagoori (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/093,760

(22) Filed: Nov. 10, 2020

(65) Prior Publication Data

US 2021/0154865 A1    May 27, 2021

(30) Foreign Application Priority Data

Nov. 22, 2019   (JP) .............................. JP2019-211190

(51) Int. Cl.
  *H01P 1/06*   (2006.01)
  *B25J 17/02*   (2006.01)
  *H01P 5/08*   (2006.01)

(52) U.S. Cl.
  CPC .......... *B25J 17/0258* (2013.01); *H01P 1/066* (2013.01); *H01P 1/068* (2013.01); *H01P 5/085* (2013.01)

(58) Field of Classification Search
  CPC .. H01P 1/06; H01P 1/061; H01P 1/062; H01P 1/066; H01P 5/18
  See application file for complete search history.

(56) References Cited

U.S. PATENT DOCUMENTS

| | | | | |
|---|---|---|---|---|
| 4,730,224 | A | * | 3/1988 | Komatsu .................. H01P 1/068 333/261 |
| 5,192,923 | A | * | 3/1993 | Komatsu .................. H01P 1/068 333/116 |
| 5,892,411 | A | * | 4/1999 | Schwan .............. H04L 25/0292 333/24 R |
| 6,838,958 | B2 | | 1/2005 | Lonsdale et al. |
| 9,136,912 | B2 | | 9/2015 | West et al. |
| 2008/0278267 | A1 | | 11/2008 | Beckley et al. |

FOREIGN PATENT DOCUMENTS

CN    101138127 A    3/2008
JP    2002-033607 A    1/2002

* cited by examiner

*Primary Examiner* — Dean O Takaoka
(74) *Attorney, Agent, or Firm* — Oliff PLC

(57) ABSTRACT

A rotary joint according to an aspect of the present disclosure includes a first microstrip line, a second microstrip line, a transmitting circuit connected to one end of the first microstrip line and configured to output a communication signal, a transmitting-side terminator connected to the other end of the first microstrip line, a receiving-side terminator connected to one end of the second microstrip line, and a receiving circuit connected to the other end of the second microstrip line and configured to receive the communication signal, in which the first and second microstrip lines and are set along at least a part of a circular ring having a circumferential length equal to an integral multiple of a wavelength of a traveling wave with which the communication signal propagates through the microstrip lines.

3 Claims, 5 Drawing Sheets

ROTARY JOINT

CROSS REFERENCE TO RELATED APPLICATIONS

This application is based upon and claims the benefit of priority from Japanese patent application No. 2019-211190, filed on Nov. 22, 2019, the disclosure of which is incorporated herein in its entirety by reference.

BACKGROUND

The present disclosure relates to a rotary joint. In particular, the present disclosure relates to a rotary joint that performs communication between a stationary body and a rotating body in a joint part that rotates endlessly.

Regarding robot arms, it has been proposed to use the same arm for various purposes by replacing a hand part attached to the tip of the arm with a different one in order to use the arm for such various purposes. In such cases, the hand part may be used in such a manner that it is rotatable with respect to the arm part which serves as the stationary body. In such cases where the hand part is rotatably attached to the arm, a rotary joint that supports the rotating body in an endlessly rotatable manner is used in a joint part. Further, communication is performed between the stationary body and the rotating body through the rotary joint. Therefore, Japanese Unexamined Patent Application Publication No. 2002-33607 discloses an example of a method for disposing an antenna in a rotary joint.

The rotary joint disclosed in Japanese Unexamined Patent Application Publication No. 2002-33607 has a structure for fixing a pair of antenna-element substrates holding antenna elements composed of inner and outer double rings surrounding a rotation shaft in a non-contact type signal transmission device, in which: the pair of antenna-element substrates are attached to a rotating body fixed to the rotation shaft and a stationary body stationary relative to the rotating body, respectively, through support members; each of the pair of antenna element substrates is fixed to a respective one of the support members at a plurality of places located at predetermined angular intervals between the inner and outer double rings; a projection part is formed on one end surface of the support member; a recessed part is formed between the inner and outer double rings of each of the antenna-element substrates; and each of the pair of antenna-element substrates is fixed on a respective one of the support members by engagement of the recessed part with the projection part.

SUMMARY

For the control of a hand part of a robot arm, simply transmitting/receiving status information is inadequate. That is, it is necessary to perform high-speed communication for performing real-time control. However, in the case of the antenna element substrates described in Japanese Unexamined Patent Application Publication No. 2002-33607, it is difficult to perform high-speed communication.

The present disclosure has been made in order to solve above-described problem and an object thereof is to perform high-speed communication in an endlessly rotatable rotary joint by using loose coupling between microstrip lines.

A first exemplary aspect is a rotary joint including: a first microstrip line disposed along a circular ring set on a stationary body of the rotary joint; a second microstrip line disposed along a circular ring set on a rotating body so as to be opposed to the first microstrip line, the rotating body being configured to be engaged into the stationary body of the rotary joint in an endlessly rotatable manner; a transmitting circuit connected to one end of the first microstrip line and configured to output a communication signal; a transmitting-side terminator connected to the other end of the first microstrip line; a receiving-side terminator connected to one end of the second microstrip line; and a receiving circuit connected to the other end of the second microstrip line and configured to receive the communication signal, in which the first and second microstrip lines are set along at least a part of a circular ring having a circumferential length equal to an integral multiple of a wavelength of the traveling wave with which the communication signal propagates through the microstrip lines, and when a direction from the transmitting circuit toward the transmitting-side terminator is defined as a first direction, the receiving circuit is disposed on a tip side of the second microstrip line in the first direction and the receiving-side terminator is disposed on a root side of the second microstrip line in the first direction.

According to the rotary joint in accordance with the present disclosure, it is possible to perform non-contact high-speed communication using a wideband communication signal at a high carrier (RF) frequency between a stationary body and a rotating body through microstrip lines set along at least a part of a circular ring having a circumferential length equal to an integral multiple of a wavelength of the traveling wave with which a communication signal propagates through the microstrip lines.

According to the present disclosure, it is possible to perform, in a rotary joint including a rotating body that can endlessly rotate with respect to a stationary body thereof, non-contact high-speed communication between the stationary body and the rotating body.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
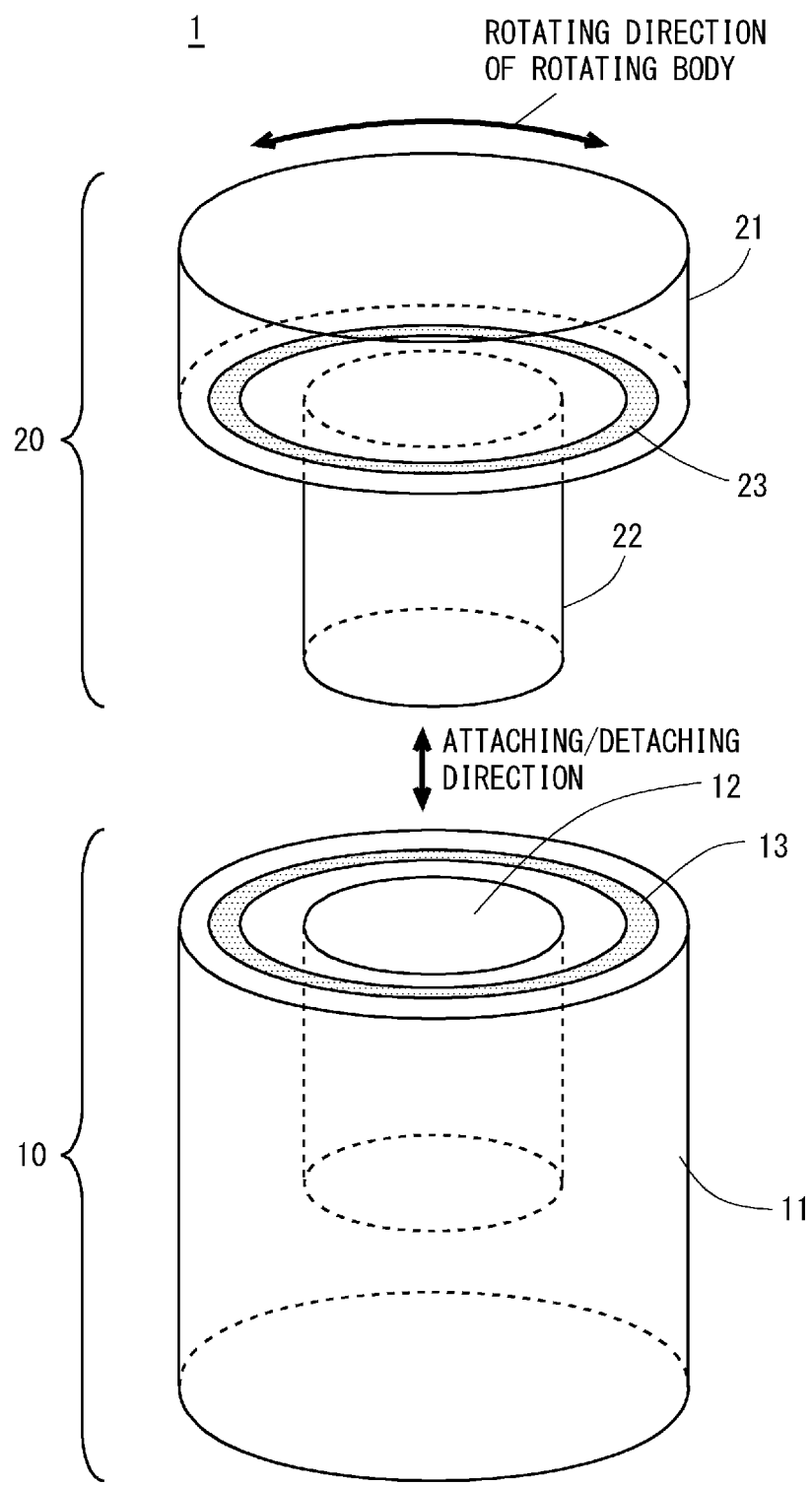
FIG. 1 is a schematic diagram of a rotary joint according to a first embodiment.

Firstly, FIG. 1 is a schematic view of a rotary joint 1 according to a first embodiment. As shown in FIG. 1, the rotary joint 1 according to the first embodiment includes a stationary body 10 and a rotating body 20. The stationary body 10 is, for example, a joint part attached to the tip of an arm part of a robot arm. The rotating body 20 is a joint part of a hand part of the robot arm. Further, the rotating body 20 has a structure by which the rotating body 20 can be attached to and detached from the stationary body 10. Details of the attaching/detaching structure are omitted in FIG. 1. Further, the rotating body 20 is attached to the stationary body 10 so that the rotating body 20 can rotate endlessly along a plane orthogonal to the attaching/detaching direction to/from the stationary body 10.

The stationary body 10 includes a housing 11. Further, a joint recessed part 12 is formed in the housing 11. The joint recessed part 12 is an opening into which a joint projection part 22 is engaged. Further, the housing 11 has a flat surface opposed to the rotating body 20. Further, a first microstrip line 13 is provided on this flat surface.

The rotating body 20 includes a housing 21. Further, a joint projection part 22 is provided in the housing 21. The joint projection part 22 is a projection member projecting from the housing 21. Further, the housing 21 has a flat surface opposed to the stationary body 10. Further, a second microstrip line 23 is provided on this flat surface.

Note that the first and second microstrip lines 13 and 23 are arranged so that the lines are opposed to each other on the flat surfaces opposed to each other. Further, the first microstrip line 13 is disposed along a circular arc set on the stationary body 10 and the second microstrip line 23 is disposed along a circular arc set on the rotating body 20. It is desirable that the first and second microstrip lines 13 and 23 have such shapes that propagation constants of traveling waves propagating through these lines become equal to each other. Note that the first and second microstrip lines 13 and 23 are arranged so that the lines are opposed to each other on the flat surfaces opposed to each other. In this way, a part of a signal (a traveling wave) propagating through the first microstrip line is converted into a traveling wave that propagates through the second microstrip line and has the same propagation constant as that of the traveling wave propagating the first microstrip line by the loose coupling of electromagnetic fields generated by the electromagnetic waves propagating through the microstrip lines. Further, similarly, a part of a signal (a traveling wave) propagating through the second microstrip line is converted into a traveling wave that propagates through the first microstrip line and has the same propagation constant as that of the traveling wave propagating the second microstrip line. In the example shown in FIG. 1, each of the first and second microstrip lines 13 and 23 has a circular-ring shape with no gap therein. However, in practice, each of them may have a circular-arc shape with a gap(s) formed therein so that a transmitting circuit, a receiving-circuit terminator, and the like are connected to them.

Figure 2:
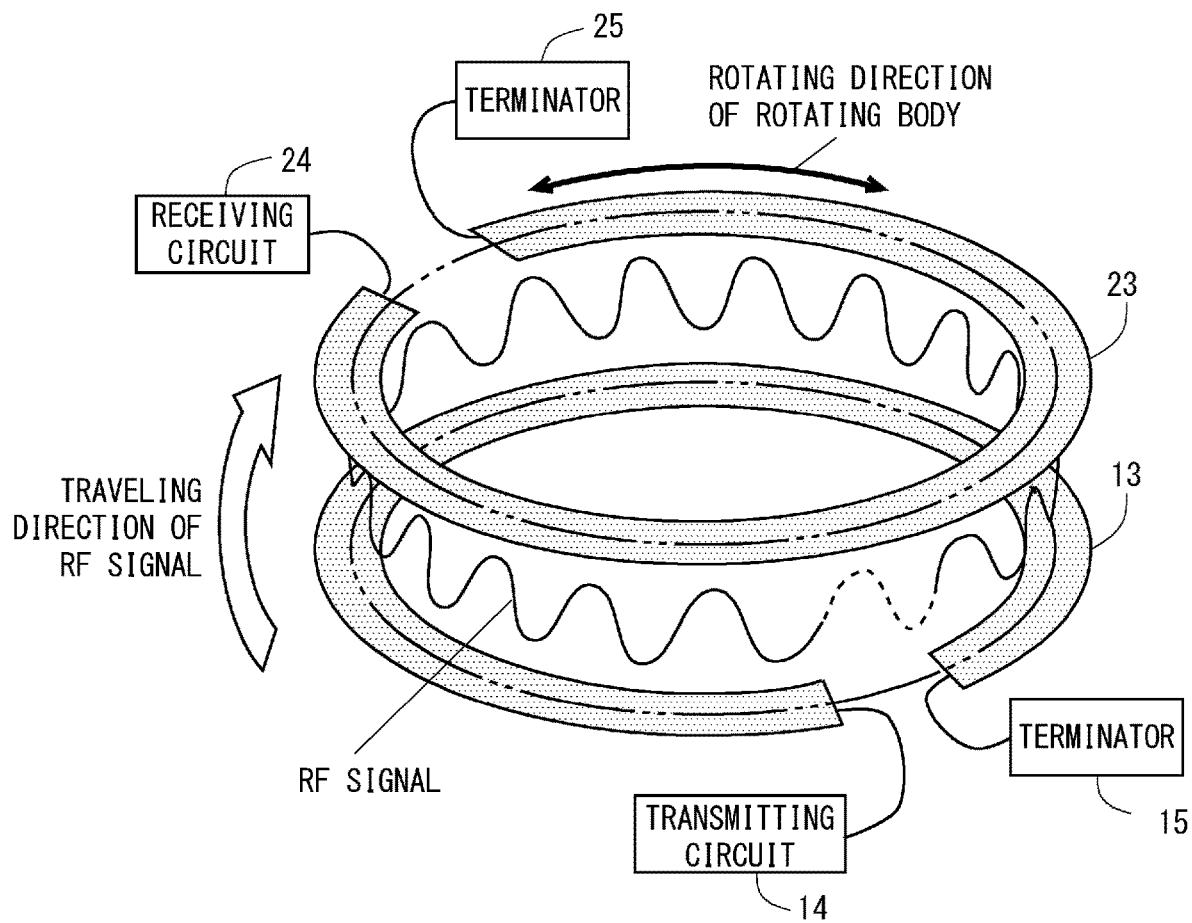
FIG. 2 is a block diagram of a communication interface circuit according to the first embodiment.

A communication interface circuit using microstrip lines provided in the rotary joint 1 will be described in detail. FIG. 2 is a block diagram of a communication interface circuit according to the first embodiment.

As shown in FIG. 2, in the communication interface circuit according to the first embodiment, each of the first and second microstrip lines 13 and 23 is provided in a circular-arc shape in which the ends of the microstrip line are separated from each other. Note that in FIG. 2, for the sake of easier understanding, the ends of the microstrip lines are widely separated from each other. However, in practice, the length of the separation (hereinafter referred to as the separation width) may be extremely small. The separation width needs to satisfy the following microstrip-line length condition. The microstrip-line length condition is a condition that the circumferential length (the circular ring) of each of the first and second microstrip lines 13 and 23 with no separation width is equal to an integer multiple of the wavelength of an RF signal that propagates therethrough, and the microstrip line is disposed along a part of the circumferential length or along the whole circumferential length. That is, the microstrip-line length condition is a condition that the length of the circular ring along which each of the first and second microstrip lines 13 and 23 is disposed is equal to an integer multiple of the traveling wavelength of a communication signal that propagates through the microstrip line, and each of the first and second microstrip lines 13 and 23 from which a communication signal is actually radiated is disposed along at least a part of the circular ring. By defining the above-described microstrip-line length condition, it is possible to correctly transmit and receive an RF signal between the transmitting circuit 14 and the receiving circuit 24 irrespective of the relative rotational positions of the first and second microstrip lines 13 and 23 (details of this feature will be described later).

Further, a transmitting circuit 14 is provided at one end of the first microstrip line 13 and a transmitting-side terminator device (e.g., a terminator 15) is provided at the other end of the first microstrip line 13. The transmitting circuit 14 outputs an RF signal, which serves as a communication signal, to the first microstrip line 13. This RF signal is a traveling wave propagating through the microstrip line. The RF signal travels in a first direction that is a direction from the transmitting circuit 14 toward the terminator 15. Further, the RF signal is also transmitted from the first microstrip line 13 to the second microstrip line 23 through electromagnetic coupling between the first and second microstrip lines 13 and 23. In FIG. 2, the RF signal is schematically shown for the purpose of explanation.

A receiving-side terminator device (e.g., a terminator 25) is provided at one end of the second microstrip line 23 and a receiving circuit 24 is provided at the other end of the second microstrip line 23. More specifically, the receiving circuit 24 is connected to an end of the second microstrip line 23 that is positioned on the tip side thereof as viewed in the first direction. The terminator 25 is connected to an end of the second microstrip line 23 that is positioned on the root side thereof as viewed in the first direction.

In the rotary joint 1 according to the first embodiment, the first and second microstrip lines 13 and 23 come close to each other in a state where the rotating body 20 is mounted on the stationary body 10. Then, by making the transmitting circuit 14 transmit an RF signal to the first microstrip line 13 in the state where the first and second microstrip lines 13 and 23 are close to each other, an RF signal is generated in the second microstrip line 23, which has been electromagnetically coupled to the first microstrip line 13. Then, the RF signal transmitted to the second microstrip line 23 is received by the receiving circuit 24.

A microstrip line is a transmission path that has a structure in which a linear conductor foil is formed on the front surface of a plate-like dielectric substrate with a conductor foil formed on its rear surface, and transmits electromagnetic waves therethrough. The microstrip line transmits an electromagnetic wave (a traveling wave) by an electric field formed in a direction from the front-surface conductor toward the rear-surface conductor and a magnetic field formed in a direction surrounding the front-surface conductor. The propagation constant (the propagation speed and the characteristic impedance) of a traveling wave propagating through the microstrip line is mainly determined by the line width of the microstrip line, the dielectric constant of the dielectric substrate, and the thickness of the dielectric substrate. Therefore, it is desirable to match the shapes and the dielectric constants of the first and second microstrip lines in order to match the propagation constants of these microstrip lines each other. The carrier (RF) frequency of a signal that is transmitted through these microstrip lines is a frequency in the order of GHz or higher having a small fractional band in which fluctuations in the phase and in the amplitude in one wavelength of the electromagnetic wave traveling through the lines are small even if the bandwidth of the transmitted signal is increased. Therefore, it is possible to perform high-speed data communication by using a wide-band signal.

As described above, in the rotary joint 1 according to the first embodiment, the first and second microstrip lines 13 and 23 are provided so as to be opposed to each other on the opposed surfaces in a state where the joint projection part 22 of the rotating body 20 is engaged into the housing 11 of the stationary body 10. Further, the first and second microstrip lines 13 and 23 are disposed along at least a part of a circular ring having a length equal to an integral multiple of the wavelength of an RF signal propagating through these microstrip lines. The traveling wave propagating through the first microstrip line 13 forms a part of a virtual traveling wave propagating endlessly along the circular ring. Further, by an electromagnetic field generated by this traveling wave, a part of a virtual propagating wave also traveling endlessly along the circular ring is generated in the second microstrip line 23. The traveling wave generated in the second microstrip line 23 forms a part of the virtual traveling wave propagating endlessly along the circular ring. Therefore, even when the first and second microstrip lines constitute a part(s) of the circular ring, instead of constituting the whole circular ring, and irrespective of which part of the virtual traveling wave its position corresponds to, the behavior of the traveling wave generated in the second microstrip line 23 does not change. The propagation speed of the virtual traveling wave has a value obtained by multiplying the speed of light by a wavelength reduction rate (about 50%) determined by the shape of the microstrip line, and the order of magnitude can be considered roughly equal to the speed of light. Therefore, the rotating body 20 can be regarded as being in a quasi-static state and hence the influence of the rotating speed of the rotating body is extremely small. Therefore, in the rotary joint 1 according to the first embodiment, it is possible to perform high-speed communication between the stationary body 10 and the rotating body 20 by using a wideband RF signal at a high frequency while endlessly rotating the rotating body 20.

Further, the communication performed in the rotary joint 1 according to the first embodiment is, for example, near-field radio communication in the order of several mm or shorter. Therefore, it is possible to perform high-speed communication even when the signal strength of the RF signal is reduced. As described above, it is possible to prevent or reduce the leakage of signals to other components or the like by performing communication by using an RF signal having a low signal strength. For example, it is possible to use the rotary joint 1 in a communication path in each of a number of joints closely placed in a robot arm.

Second Embodiment

In a second embodiment, a rotary joint 2 having a power supply function as well as a communication function for a rotating body will be described. Note that the components that have already been described in the first embodiment are denoted by the same reference numerals as those in the first embodiment, and descriptions thereof will be omitted.

Figure 3:
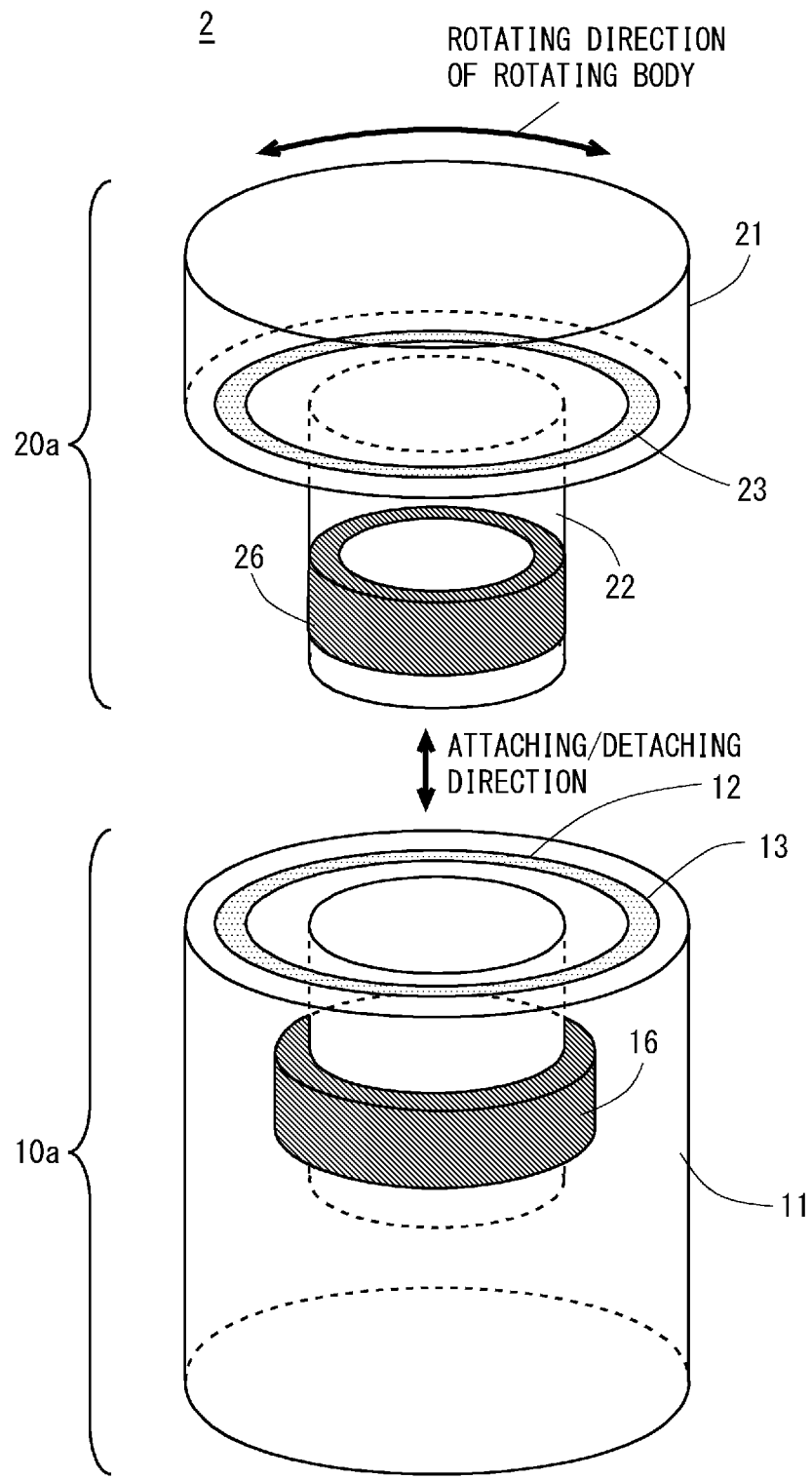
FIG. 3 is a schematic diagram of a rotary joint according to a second embodiment.

FIG. 3 is a schematic view of a rotary joint according to the second embodiment. As shown in FIG. 3, the rotary joint 2 according to the second embodiment includes a stationary body 10a and a rotating body 20a in place of the stationary body 10 and the rotating body 20, respectively. The stationary body 10a is obtained by adding a primary coil 16 in the stationary body 10. The rotating body 20a is obtained by adding a secondary coil 26 in the rotating body 20. The primary and secondary coils 16 and 26 are arranged so that they are concentrically aligned in a joint state in which the joint projection part 22 is engaged into the joint recessed part 12. Further, they form a transformer that wirelessly transmits electricity from the stationary body 10 to the rotating body 20.

Specifically, the primary coil 16 is disposed along the outer periphery of a cylinder that forms the joint recessed part 12. The secondary coil 26 is disposed along the inner periphery of a cylinder that forms the joint projection part 22. Further, in the state where the joint projection part 22 is engaged into the joint recessed part 12, the secondary coil 26 is concentrically engaged inside the primary coil 16. That is, in the state where the rotating body 20a is joined to the stationary body 10a, a transformer is formed by the primary and secondary coils 16 and 26.

As described above, by providing coils in the stationary body 10a and the rotating body 20a and thereby forming a transformer, it is possible to supply electric power from the stationary body 10a to the rotating body 20a through wireless connection therebetween. When the rotating body 10a is endlessly rotated with respect to the stationary body 20a, the effect of the above-described feature is significant because electric power is supplied through the wireless connection, so that the movement of the rotating body 20a is not hindered.

Third Embodiment

In a third embodiment, another embodiment of a method for disposing first and second microstrip lines 13 and 23 will be described. Note that the components that have already been described in the first embodiment are denoted by the same reference numerals as those in the first embodiment, and descriptions thereof will be omitted.

Figure 4:
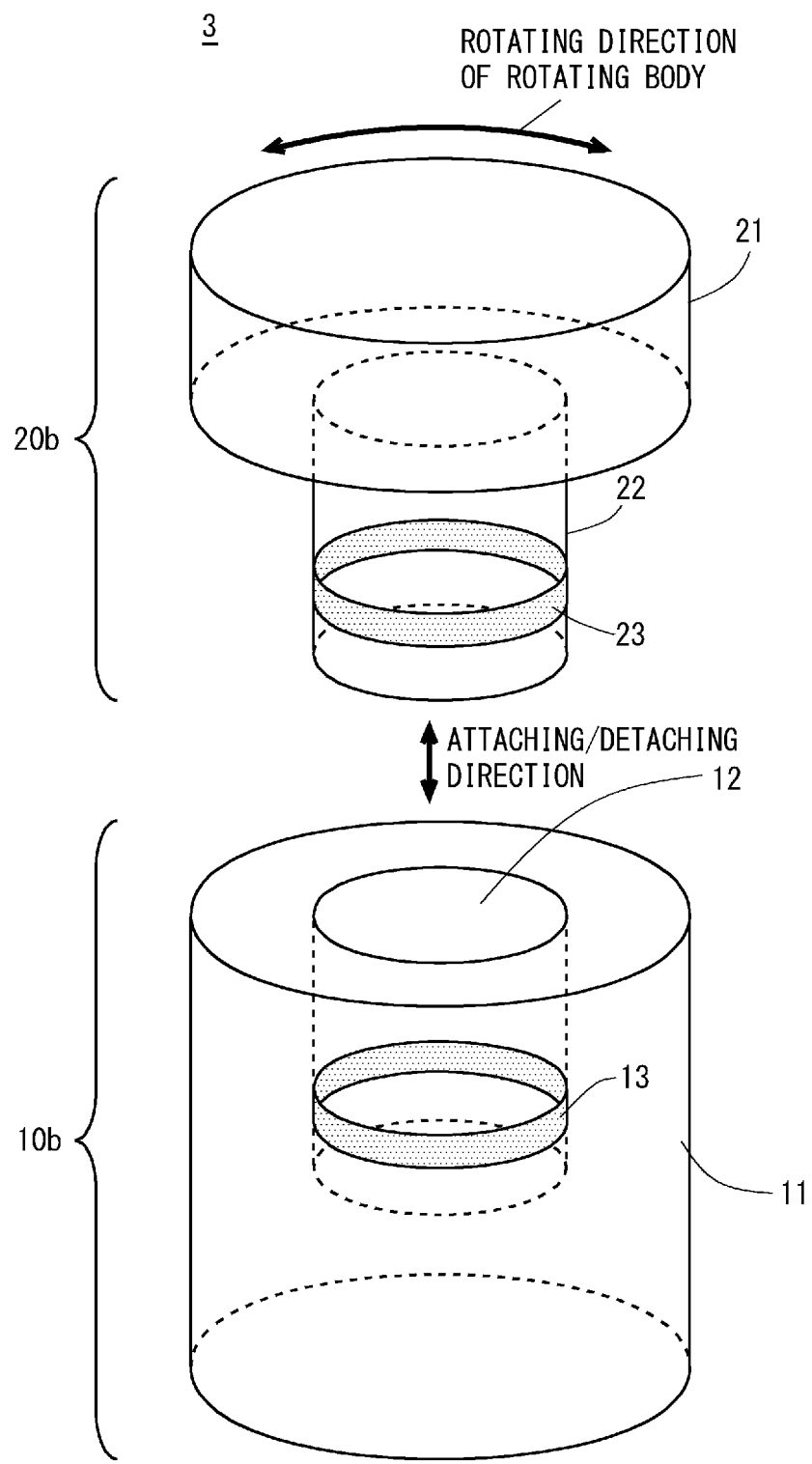
FIG. 4 is a schematic diagram of a rotary joint according to a third embodiment.

FIG. 4 is a schematic view of a rotary joint 3 according to the third embodiment. As shown in FIG. 4, the rotary joint 3 according to the third embodiment includes a stationary body 10b and a rotating body 20b in place of the stationary body 10 and the rotating body 20, respectively. In the stationary body 10b, the first microstrip line 13 is disposed along the inner periphery of the joint recessed part 12. Further, in the rotating body 20b, the second microstrip line 23 is wound around the outer periphery of the joint projection part 22. Further, the first and second microstrip lines 13 and 23 are provided in positions where they are opposed to each other in a state where the joint projection part 22 engaged into the joint recessed part 12.

With this configuration, it is also possible to transmit and receive signals between the first and second microstrip lines 13 and 23 in the state where the joint convex part 22 is engaged into the joint concave part 12. That is, the places of the microstrip lines are not limited to those on the flat surfaces of the housing 11 and the housing 21. That is, it is also possible to form a communication path by providing microstrip lines on cylindrical surfaces that are opposed to each other in the joint state.

Fourth Embodiment

In a fourth embodiment, a rotary joint 4 which is another embodiment of the rotary joint 1 according to the first embodiment will be described. Note that the components that have already been described in the first embodiment are denoted by the same reference numerals as those in the first embodiment, and descriptions thereof will be omitted.

Figure 5:
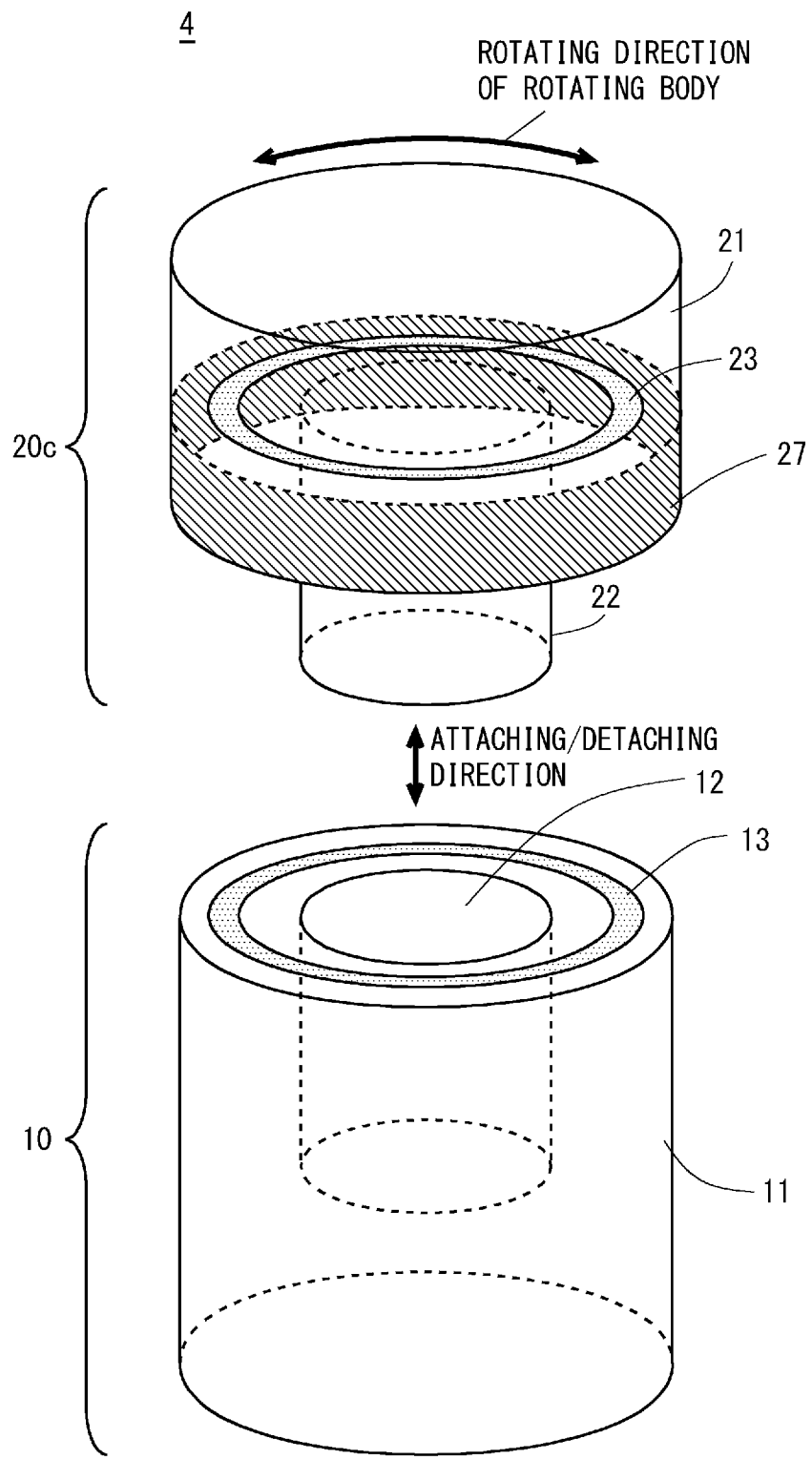
FIG. 5 is a schematic diagram of a rotary joint according to a fourth embodiment.

FIG. 5 shows a schematic diagram of a rotary joint according to the fourth embodiment. As shown in FIG. 5, the rotary joint 4 according to the fourth embodiment includes a rotating body 20c in place of the rotating body 20. The rotating body 20c is obtained by adding a electromagnetic shielding wall 27 in the rotating body 20. The electromagnetic shielding wall 27 is disposed so as to cover a gap formed between the stationary body 10 and the rotating body 20c in a state where the rotating body 20c is jointed to the stationary body 10. In the rotary joint 4 according to the fourth embodiment, the first and second microstrip lines 13 and 23 are provided on flat surfaces that are opposed to each other in a state where the rotating body 20c is joined to the stationary body 10. Therefore, a RF signal could leak through a gap formed between the flat surfaces that are opposed to each other in the joint state. Therefore, the first and second microstrip lines 13 and 23 are surrounded by the electromagnetic shielding wall 27 so that the gap is closed by the electromagnetic shielding wall 27. In this way, the RF signal, which would otherwise leak through the gap, is blocked (i.e., is prevented from interfering with other RF signals). Further, the electromagnetic shielding wall 27 prevents RF signals leaking from rotary joints provided in other joints of the robot arm from interfering with the RF signal of the own rotary joint.

As described above, in the rotary joint 4 according to the fourth embodiment, the electromagnetic shielding wall 27 is provided so as to surround the first and second microstrip lines 13 and 23 and so as to close the gap formed between the flat surfaces that are opposed to each other in the joint state. In this way, the rotary joint 4 according to the fourth embodiment can prevent the leakage of an RF signal transmitted/received between the first and second microstrip lines 13 and 23 (i.e., prevent the RF signal of the own rotary joint from electromagnetic interfering with RF signals of other rotary joints), and prevent the leakage of RF signals from other rotary joints (i.e., prevent RF signals from other rotary joints from electromagnetic interfering with the RF signal of the own rotary joint) at the same time more efficiently than the rotary joint 1 according to the first embodiment does.

Regarding industrial apparatuses such as robot arms, it is required to reduce the leakage of radio waves as much as possible in order to prevent other apparatuses from malfunctioning. Because of such circumstances of these reasons, it is significantly meaningful to prevent radio waves from leaking from rotary joints (i.e., prevent radio waves from the own apparatus interfere to other apparatuses and prevent radio waves from other apparatuses interfere to the own apparatus).

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A rotary joint comprising:
a stationary body having a recess formed in a first end of the stationary body, the recess extending in a longitudinal direction of the stationary body, the first end of the stationary body having a first flat surface that surrounds an opening of the recess;
a rotating body having a projection that extends from a second end of the rotating body, the projection extending in a longitudinal direction of the rotating body and being fitted into the recess of the stationary body so that the rotating body is engaged into the stationary body in an endlessly rotatable manner, the second end of the rotating body having a second flat surface that surrounds a base of the projection and that faces the first flat surface of the stationary body;
a first microstrip line disposed along a circular arc set on the first flat surface of the stationary body, the first microstrip line having first and second opposite ends;
a second microstrip line disposed along a circular arc set on the second flat surface of the rotating body so as to be opposed to the first microstrip line, the second microstrip line having first and second opposite ends;
a transmitting circuit connected to the first end of the first microstrip line and configured to output a communication signal;
a transmitting-side terminator connected to the second end of the first microstrip line;
a receiving-side terminator connected to the first end of the second microstrip line;
a receiving circuit connected to the second end of the second microstrip line and configured to receive the communication signal output by the transmitting circuit; and
a transformer by which electric power is transmitted and received between the stationary body and the rotating body, the transformer including a primary coil disposed around a portion of the recess of the stationary body and a secondary coil disposed around a portion of the projection of the rotating body, the primary and secondary coils being concentrically aligned with each other when the projection is inserted into the recess, wherein
the first microstrip line is disposed along at least a part of a first circular ring, the second microstrip line is disposed along at least a part of a second circular ring, both the first and second microstrip lines have a circumferential length equal to an integral multiple of a wavelength of a traveling wave with which the communication signal propagates through the first and second microstrip lines, and the first and second microstrip lines are arranged close to each other so that traveling waves propagating through the first and second microstrip lines are loosely-coupled to each other by an electromagnetic field,
the first and second microstrip lines are symmetrical to each other and have equal lengths, and
when a direction from the transmitting circuit toward the transmitting-side terminator is defined as a first direction, the receiving circuit is disposed on a tip side of the second microstrip line in the first direction and the receiving-side terminator is disposed on a root side of the second microstrip line in the first direction.

2. The rotary joint according to claim 1, further comprising a shielding member surrounding the first and second microstrip lines and configured to electromagnetically block the communication signal.

3. The rotary joint according to claim 1, wherein the stationary body and the rotating body are detachably connected to each other.

* * * * *